US008995337B2

(12) United States Patent
Haddad et al.

(10) Patent No.: US 8,995,337 B2
(45) Date of Patent: Mar. 31, 2015

(54) METHOD AND APPARATUS FOR MANAGING THE MOBILITY OF MOBILE NETWORKS

(75) Inventors: Wassim Haddad, San Jose, CA (US); Joel Halpern, Leesburg, VA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 896 days.

(21) Appl. No.: 13/178,153

(22) Filed: Jul. 7, 2011

(65) Prior Publication Data

US 2012/0182936 A1 Jul. 19, 2012

Related U.S. Application Data

(60) Provisional application No. 61/433,091, filed on Jan. 14, 2011.

(51) Int. Cl.
*H04W 4/00* (2009.01)
*H04W 40/36* (2009.01)
*H04L 12/723* (2013.01)
*H04W 8/08* (2009.01)
*H04W 80/04* (2009.01)
*H04W 84/00* (2009.01)

(52) U.S. Cl.
CPC .............. *H04W 40/36* (2013.01); *H04L 45/50* (2013.01); *H04W 8/085* (2013.01); *H04W 8/087* (2013.01); *H04W 80/04* (2013.01); *H04W 84/005* (2013.01)
USPC .......................................................... 370/328

(58) Field of Classification Search
CPC .................................................... H04W 8/085
USPC ....................................................... 370/328
See application file for complete search history.

(56) References Cited

U.S. PATENT DOCUMENTS

| 8,565,098 | B2 * | 10/2013 | Liu et al. ........................ 370/242 |
| 2008/0130571 | A1 * | 6/2008 | Maeda et al. .................. 370/331 |
| 2008/0146237 | A1 * | 6/2008 | Shikama et al. .............. 455/438 |
| 2010/0080190 | A1 * | 4/2010 | Berzin ........................... 370/331 |

(Continued)

OTHER PUBLICATIONS

Yang T. et al. "Hierarchical Mobile MPLS: Supporting Delay Sensitive Applications Over Wireless Internet", Processings International Conferences on Info-Tech and Info-Net (ICII) 2001, IEEE, Beijing, vol. 2, Oct. 29, 2001, pp. 453-458, XP010577180, DOI: 10.1109/ICII.2001.983619 ISBN: 978-0-7803-7010-4.

(Continued)

*Primary Examiner* — Brandon Renner
*Assistant Examiner* — Faisal Choudhury

(57) ABSTRACT

In response to a Mobile Access Router (MAR) initially attaching to a Multi-Protocol Label Switching (MPLS) domain through a first Access Router (AR) in the domain, a Mobility Anchor Point (MAP) in the MPLS domain establishes a plurality of Label Switched Paths (LSPs) for the MAR. For example, the MAP establishes an active LSP to the MAR through the AR to which the MAR has initially attached, and further establishes an inactive LSP for the MAR to each of one or more other ARs in the MPLS domain. An inactive LSP established at a given AR for a given MAR is activated when/if that MAR attaches to the AR. Correspondingly, the present invention includes method and apparatus teachings related to the MAP, ARs and the MAR, as regards establishing inactive LSPs, activating inactive LSPs, and extending an activated LSP to the MAR.

20 Claims, 9 Drawing Sheets

(56) References Cited

U.S. PATENT DOCUMENTS

| | | | |
|---|---|---|---|
| 2010/0150108 A1* | 6/2010 | Aghvami et al. | 370/331 |
| 2010/0202344 A1* | 8/2010 | Kawakami | 370/328 |
| 2011/0058532 A1* | 3/2011 | Berzin | 370/331 |

OTHER PUBLICATIONS

Atkinson R. "ILNP Concept of Operations", IETF, Internet drafts, draft-rja-ilnp-intro-06, Aug. 18, 2010, the whole document.

Rosen E. et al., "Multiprotocol Label Switching Architecture", IETF, RFC 3031, Jan. 2001, the whole document.

* cited by examiner

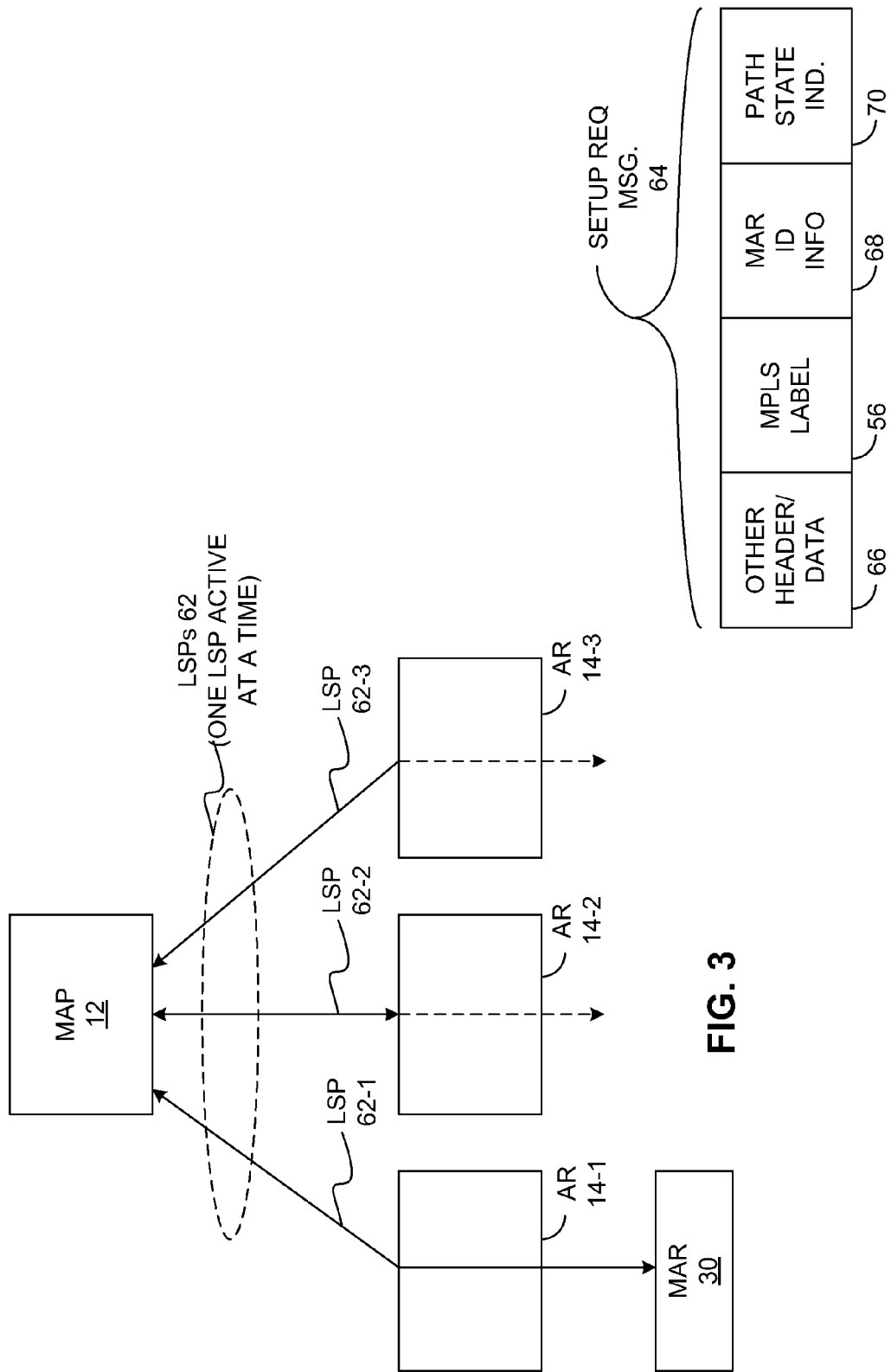

METHOD AND APPARATUS FOR MANAGING THE MOBILITY OF MOBILE NETWORKS

RELATED APPLICATIONS

This application claims priority under 35 U.S.C. §119 from the U.S. provisional patent application filed on 14 Jan. 2011, which is identified by App. No. 61/433,091 and which is expressly incorporated by reference herein.

FIELD OF THE INVENTION

The present invention generally relates to mobility within network domains, and particularly relates to network mobility, such a where a mobile access router or MAR moves within a network domain.

BACKGROUND

As cellular and other access technologies extend the reach and power of the Internet to an increasingly rich and diverse array of mobile devices, increasingly complex mobility management challenges arise. For example, a person's cell phone may provide Internet access for a host of other local devices, such as computers, gaming systems, navigation units, and even certain types of medical implants. A cell phone operating in such an environment serves as a mobile access router or MAR. That is, the cell phone serves as a point of attachment for the local devices its supports, but the cell phone itself is mobile within the cellular network.

Similar scenarios arise in the context of public transportation, such as where a train or airplane provides Internet connectivity to the various devices being operated by its onboard passengers. Here, an onboard MAR serves as a point of attachment for the onboard devices and itself must in turn attach directly or indirectly to the fixed Internet infrastructure. Substantially the same circumstance applies to the contemporary automobile, where the automobile provides WiFi or other local network service for connecting passengers' devices and even onboard systems and sensors, to the Internet infrastructure.

In this regard, the MAR and its end hosts (i.e., the local devices attached to the MAR) can be viewed as network capable of roaming within and across other networks. The term "Network Mobility" (often abbreviated as "NEMO") describes this scenario. Broadly, a mobile network has at least one MAR that connects to the fixed infrastructure, and the end hosts operating within the mobile network connect to the infrastructure through the MAR. As an example, the MAR connects to the IP infrastructure through cellular or other wireless network links.

Because IP networks were not designed with mobile environments in mind, NEMO presents a number of significant challenges. Consider the role played by IP addressing in both IPv4 and IPv6. In one aspect, an IP address serves as a locator that specifies how to reach a particular node. The supporting network routing systems maintain routing tables or other data structures that identify how to reach the node using the IP address of the node. In this regard, potentially many different devices may operate within the same network domain and will therefore have IP addresses that share a common prefix associated with that domain.

This point suggests the second key aspect of IP addresses; namely, the full IP address of a device serves as a unique identifier. From an end point perspective, one may understand the task of routing IP traffic as routing data packets from one end point to one or more other uniquely identified end points, as identified by their respective IP addresses. Transmission Control Protocol (TCP) is an example of a key IP-related protocol that uses end point IP addresses as part of its TCP connection identifiers.

The above formulation and use of IP addresses complicates NEMO, which makes IP based solutions to NEMO mobility management at least somewhat problematic. For an example of NEMO solutions that operate at the IP layer, see the Network Mobility Basic Support Protocol, as defined in RFC 3963. For more background, one should also refer to the Mobile IPv6 standard itself, maintained by the IETF and described in detail in RFC 3775.

Within the context of Mobile IPv6, a permanent anchor point called the home agent ("HA") supports mobility management. In the specific context of NEMO, the HA communicates only with the MAR of a given mobile network, and the MAR persistently advertises the same network prefix to all end hosts attached to it. This approach presents a number of problems in the context of NEMO, beginning with its requirement of having a permanent anchor point—the HA. Moreover, the approach requires tunneling all data traffic through the permanent HA and this requirement leads to suboptimal routing and more broadly gives rise to a number of performance issues. One consequence of the anchor point approach and the attendant tunneling of traffic is that there is no opportunity for efficient routing of traffic between end points attached to different NEMOs operating in different network domains.

SUMMARY

In one aspect, the present invention enables mobility within a given network domain ("micro mobility") for a mobile network in which one or more "homeless" mobile access routers (MARs) provide connectivity to a set of end hosts. Advantageously, from inside the NEMO, the end hosts appear to be "virtually" static.

As another advantage, the present invention in one or more embodiments optimizes micro mobility by implementing a split environment that separates in some sense the identification of a node from the location information for that node. In at least one embodiment, the ID/location split is implemented within a Multi-Protocol Label Switching (MPLS) domain in which NEMO micro mobility within the domain is optimized using a mix of hierarchical identities, locations, certificates and certain MPLS features. As a further advantage, the methods and apparatuses as proposed in one or more embodiments herein provide the same optimization and other advantages to the scenario of two NEMOs communicating with each other while being attached to different MPLS domains.

One aspect of the implementation involves the use of a "homeless" NEMO mechanism using protocols such as MPLS and the Inactive Network Layer Protocol or INLP, where those protocols are applied within a limited domain, such as an MPLS domain that includes a number of Access Routers (ARs) for use by MARs and other devices in attaching to the MPLS domain. In such contexts, the term micro mobility can be understood as referring to managing the mobility of a MAR as it moves between or among the ARs within the domain.

With the above advantages and features in mind, one embodiment of the present invention comprises a method of managing the mobility of a Mobile Access Router (MAR) within a Multi-Protocol Label Switching (MPLS) domain that includes a plurality of Access Routers (ARs) communicatively coupled to a Mobility Anchor Point (MAP) of the MPLS domain. The method of this embodiment is implemented in the MAP, e.g., in fixed and/or programmable digital processing circuitry that is configured to carry out the method.

According to the example method, in response to a MAR initially attaching to the MPLS domain through a first one of the ARs in the plurality of ARs, the method includes binding a MAR identifier to an MPLS label for use in routing to or from the MAR within the MPLS domain and establishing a plurality of Label Switched Paths ("LSPs") bound to the MPLS label of the MAR. Here, establishing a "plurality of LSPs" includes establishing an active LSP for the MAR through the first AR and establishing an inactive LSP for the MAR to each remaining AR, so that each remaining AR in the plurality of ARs has an established LSP for the MAR that can be activated later in response to the MAR subsequently attaching to the remaining AR. As will be seen by way of various examples later herein, prospectively establishing the inactive LSPs provides significant mobility management simplifications because each of the remaining ARs will have an already established LSP that can be activated when/if the MAR later moves to that remaining AR. In particular, the previously established but inactive LSP at the AR can be activated efficiently and simply, based on recognizing and validating the certificate of the MAR upon the MAR attempting attachment to the AR.

The method further includes the MAP sending data to the MAR and receiving data from the MAR, as needed, via the active LSP and changing which LSP is considered by the MAP to be the active LSP for the MAR, responsive to detecting movement by the MAR from one AR to another. In this sense, it will be understood that a given MAR will initially attach to the MPLS domain through a given one of the ARs and that the active LSP thus will involve that first AR, with inactive LSPs being prospectively established with some or all of the remaining ARs in the MPLS domain. Then, over time as the MAR moves within the MPLS domain, given inactive LSPs are individually activated as needed, with the previously active LSP being inactivated and retained for possible subsequent use.

In the above context establishing each inactive LSP comprises, for example, the MAP sending a path setup request message to a respective one of the remaining ARs, where that message includes the MPLS label for the MAR and a path state indicator indicating that the requested path is to be established as an inactive path. As an example, a known path setup request message as used in conventional MPLS may be extended or otherwise modified by including an information element (IE) or other data item used to indicate whether the request requests establishment of an active or inactive LSP.

Further, the contemplated path request message includes MAR identification information, so that each remaining AR can: (1) identify the MAR upon any subsequent attachment to the AR by the MAR and, (2) in response to such identification, activate the inactive LSP for the MAR. More broadly, by receiving MAR identification information in the path setup request message, such as all or part of a MAR certificate, or hash or other identification value derived from the MAR certificate, any AR in the MPLS domain can establish an inactive LSP for a particular MAR and then use its stored MAR identification information to recognize that particular MAR when that MAR attempts attachment through the AR. In this regard, it will be understood that the MAR provides its certificate or other identification information to an AR as part of the attachment attempt.

In another embodiment, the present invention comprises a Mobility Anchor Point (MAP) configured for managing the mobility of a Mobile Access Router (MAR) within a Multi-Protocol Label Switching (MPLS) domain that includes a plurality of ARs that are communicatively coupled to the MAP. By way of example, the MAP comprises an ingress interface for sending and receiving data within the MPLS domain, and further comprises an egress interface for transferring data between the MPLS domain and an external network.

The MAP further comprises a network processor that is operatively associated with the ingress and egress interfaces and configured to carry out certain processing that provides optimized micro mobility management for a NEMO. In particular, in response to the MAR initially attaching to the MPLS domain through a first one of the ARs in the plurality of ARs, the network processor binds a MAR identifier to an MPLS label for use in routing to or from the MAR within the MPLS domain and establishes a plurality of Label Switched Paths (LSPs) bound to the MPLS label of the MAR. In particular, establishing the plurality of paths includes establishing an active LSP for the MAR through the first AR and establishing an inactive LSP for the MAR to each remaining AR, so that each remaining AR in the plurality of ARs has an established LSP for the MAR that can be activated later in response to the MAR subsequently attaching to the remaining AR.

Further, the network processor in the MAP is configured to send data to the MAR and receive data from the MAR, as needed, via the active LSP and is configured to change which LSP—among the plurality of LSPs that were initially established for the MAR—is considered by the MAP to be the active LSP for the MAR, responsive to detecting movement by the MAR from one AR to another. The MAP may be configured to detect such movement explicitly or implicitly. In any case, the network processor in the MAP is configured to establish each inactive LSP by sending a path setup request message to a respective one of the remaining ARs.

The message includes the MPLS label for the MAR and a path state indicator indicating that the requested path is to be established as an inactive path. The message further includes MAR identification information, so that any AR already having an inactive LSP established for the MAR can identify the MAR upon any subsequent attachment by the MAR through the AR and, in response to such identification, activate the inactive LSP for the MAR.

In another embodiment, the present invention comprises a method of managing the mobility of a MAR within a MPLS domain that includes a plurality of ARs communicatively coupled to a MAP of the MPLS domain. The method is implemented in any one of the ARs, e.g., implemented on an individual basis in each of the ARs in the MPLS domain. The method includes receiving a path setup request message from the MAP for establishing an LSP for the MAR before the MAR has attached to the AR—in other words, the establishment of the AR is prospective, to be established in view of the possibility that at some later time the MAR may move to the AR. The path setup request message includes an MPLS label for the MAR, MAR identification information, and a path state indicator.

Correspondingly, according to the method, the AR is configured to determine from the path state indicator that the LSP is to be established in an inactive state, pending a subsequent attachment by the MAR to the AR. Thus, according to the method, the AR establishes the LSP at the AR as an inactive LSP waiting for subsequent attachment to the AR by the MAR. This is done based in part on storing the MPLS label for the MAR in association with the inactive LSP, and further based on the AR storing the MAR identification information or information derived therefrom. The AR subsequently receives MAR credentials from the MAR in conjunction with the MAR attaching to the AR, identifies from the MAR credentials that the MAR is associated with the inactive LSP, and activates the inactive LSP, based at least in part on signaling the MAR, to extend the LSP to the MAR.

In yet another embodiment, the present invention comprises an AR configured for facilitating mobility management of a MAR within an MPLS domain that includes a plurality of such ARs communicatively coupled to a MAP of the MPLS domain. The example AR comprises an ingress interface for sending and receiving data to the MAR, and an egress interface for transferring said data between the ingress interface and the MPLS domain.

Still further, the AR includes a routing processor configured to receive a path setup request message from the MAP for establishing an LSP for the MAR before the MAR has attached to the AR. The path setup request message includes an MPLS label for the MAR, MAR identification information, and a path state indicator. The routing processor is configured to determine from the path state indicator that the LSP is to be established in an inactive state, pending a subsequent attachment by the MAR to the AR and, correspondingly, to establish the requested LSP at the AR as an inactive LSP waiting for subsequent attachment to the AR by the MAR.

The AR does this based in part on storing the MPLS label for the MAR in association with the inactive LSP, and further storing the MAR identification information or information derived therefrom, for use in later recognizing the MAR in a subsequent attachment attempt by the MAR. The AR subsequently receives MAR credentials from the MAR in conjunction with the MAR attaching to the AR, identifies from the MAR credentials that the MAR is associated with the inactive LSP, and activates the inactive LSP. Such activation is based at least in part on signaling the MAR to extend the LSP to the MAR.

In yet another embodiment, the present invention comprises a method of managing the mobility of a MAR within an MPLS domain that includes a plurality of ARs communicatively coupled to a MAP of the MPLS domain. The method is implemented in the MAR and includes sending MAR credentials or MAR identification information derived therefrom to one of the ARs, in conjunction with attaching to the AR. The method further includes receiving an MPLS label from the AR, for an LSP to be used for Label Switched Routing (LSR) between the MAR and the MAP, as conducted through the AR, and establishing the MAR as the endpoint for the LSP.

In yet another embodiment, the present invention comprises a MAR that is configured for operation in an MPLS domain that includes a plurality of ARs communicatively coupled to a MAP of the MPLS domain. The example MAR comprises an ingress interface for sending and receiving data to and from end hosts attached to the MAR, and an egress interface for transferring said data between the MAR and the MPLS domain. The MAR further includes a routing processor configured to send MAR credentials or MAR identification information derived therefrom to any one of the ARs, in conjunction with attaching to that AR.

The routing processor of the MAR is further configured to receive an MPLS label from the AR, for an LSP to be used for LSR between the MAR and the MAP, as conducted through the AR. Still further, the routing processor is configured to establish the MAR as the endpoint for the LSP.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 3 is a diagram illustrating an example of establishing multiple LSPs between a MAP and a MAR according to an embodiment of the present invention.

FIG. 4 is a diagram of one embodiment of a path setup request message that includes information indicating whether an LSP is to be established in the active or inactive state.

DETAILED DESCRIPTION

Figure 1:
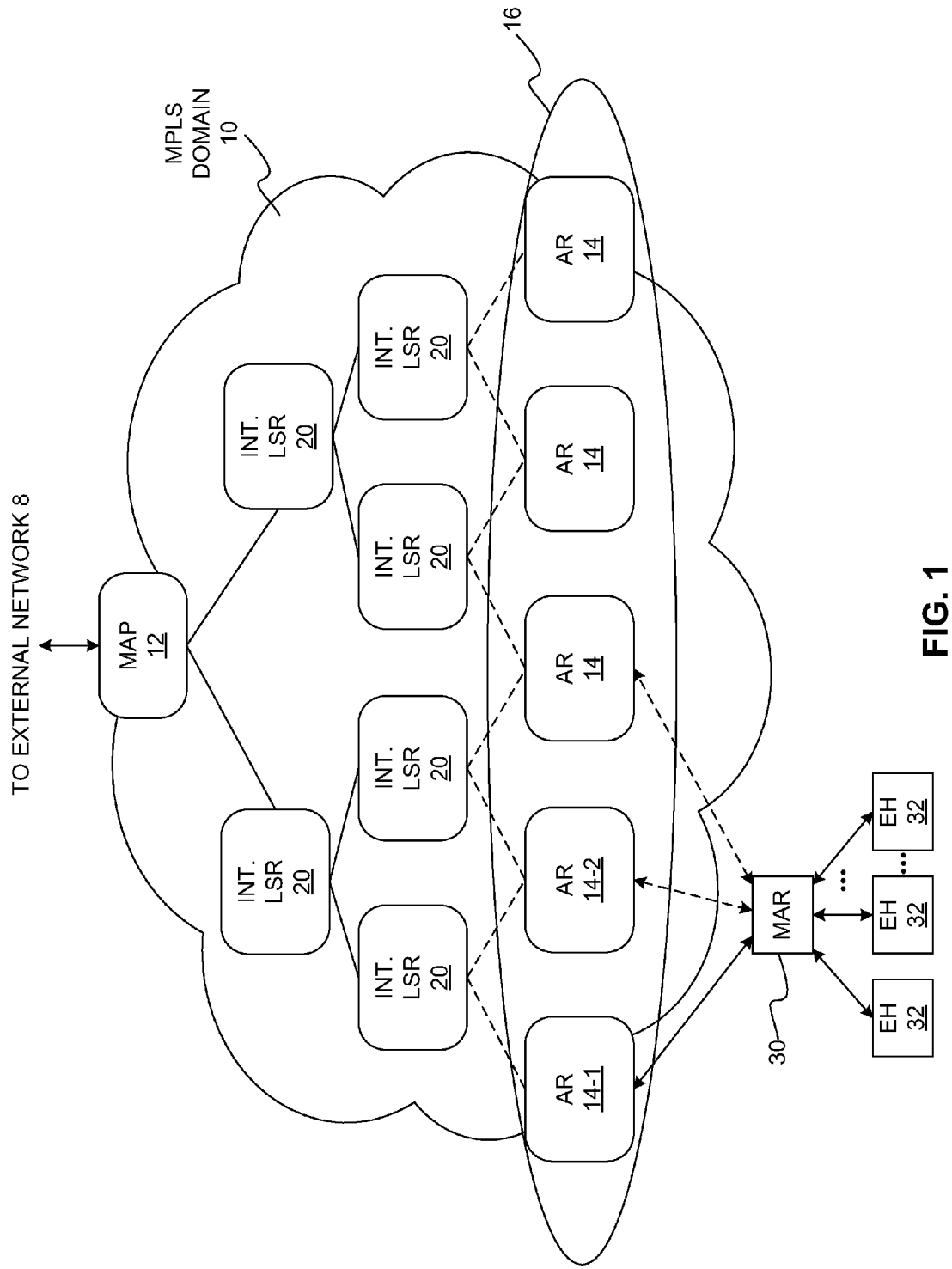
FIG. 1 is a block diagram of an MPLS domain according to an embodiment of the present invention.

Serving as a non-limiting example, FIG. 1 illustrates one embodiment of a Multiprotocol Label Switching (MPLS) domain 10 that is configured in accordance with one or more embodiments of the present invention. In at least one such embodiment, this configuration relates to a Mobility Anchor Point (MAP) 12 of the MPLS domain 10 and a plurality of Access Routers (14) that are communicatively coupled to the MAP 12 and that serve as attachment points for attaching to the MPLS domain 10.

The reference numeral "14" is used for both singular references to a given AR, e.g., "AR 14," and for plural references to more than one AR, e.g., "ARs 14." Where distinguishing between individual ARs 14 aids understanding, unique suffixes are used, e.g., AR 14-1, AR 14-2, and so on. Thus, in FIG. 1, one sees a number of ARs 14 that provide attachment points for the MPLS domain 10. Each AR 14 is communicatively coupled to the MAP 12, where such coupling may be through essentially any number of Label Switched Routers (LSRs) 20.

It is assumed herein that the reader is familiar with Label Switched Routing and MPLS in general. For example, one may refer to RFC 3031, which is maintained by the IETF and entitled "Multiprotocol Label Switching Architecture." However, it may be worth reiterating a few basic points of MPLS. First, MPLS operates independent from layer-2 and layer-3 protocols, like ATM and IP. Second, MPLS maps IP addresses to fixed-length labels that are used for routing traffic along Label Switched Paths (LSPs). An LSP can be understood as a sequence of labels at each and every node along the path from a source to a destination. A number of protocols may be used for distributing such labels. In particular, the reader should refer to the Label Distribution Protocol (LDP) as an example.

Label based routing is enabled by inserting simple, fixed-length labels at the beginning of IP packets, ATM cells, etc. Rather than having to perform more complex header inspection, which for example requires a router to evaluate IP addressing information, an LSR need only inspect the label to determine the next routing hop. This simplification enables high-speed, efficient routing of data along LSPs. In a more complete sense, MPLS can be understood as providing a number of advantages including QoS management and traffic engineering.

One assumption to consider in particular with the illustrated MPLS domain 10 is that the domain 10 and a Mobile Access Router (MAR) 30 that attaches to the MPLS domain 10 both implement an ID/location split environment, in which device (more broadly, "host") identifiers are maintained separately from host location information. In an ID/location split environment, an end host 32 attached to the MPLS domain 10 through the MAR 30 will be assigned a location that is configured on the MAR's egress interface. The "homeless" MAR 30 is responsible for advertising each end host's real topological location to the outside world.

Consequently, the end hosts 32 do not experience network mobility in the conventional sense, as they are essentially static within the mobile network provided by the MAR 30, despite the fact that that mobile network may move within the MPLS domain 10. As the real topological location for an end host 32 is the one configured on the MAR's egress interface, it follows that within a particular micro-mobility domain, one can immediately assume two levels of locators for an end host 32 attached to the MAR (i.e., a MAP-level locator and a MAR-level locator).

A further assumption herein is that the MAR 30 has a certificate that states its functionality as well as the location advertised by the MAR 30 to its end hosts 32. Such a certificate may be self-generated. Here, the assumption that the MAR's certificate states its functionality may be satisfied by a certificate that includes an indicator, flag, or other data that indicates that the MAR 30 is a mobile router. In other words, in at least one embodiment, the MAP 12 and/or other entities in the MPLS domain 10 may initiate the establishment of inactive LSPs within the MPLS domain for the MAR 30 upon initial attachment of the MAR 30 to the MPLS domain 10, in response to recognizing from the MAR's certificate that the MAR 30 is a mobile router. Further, in at least one embodiment, the certificate includes a public encryption key, e.g., for authentication or other security function.

Figure 2:
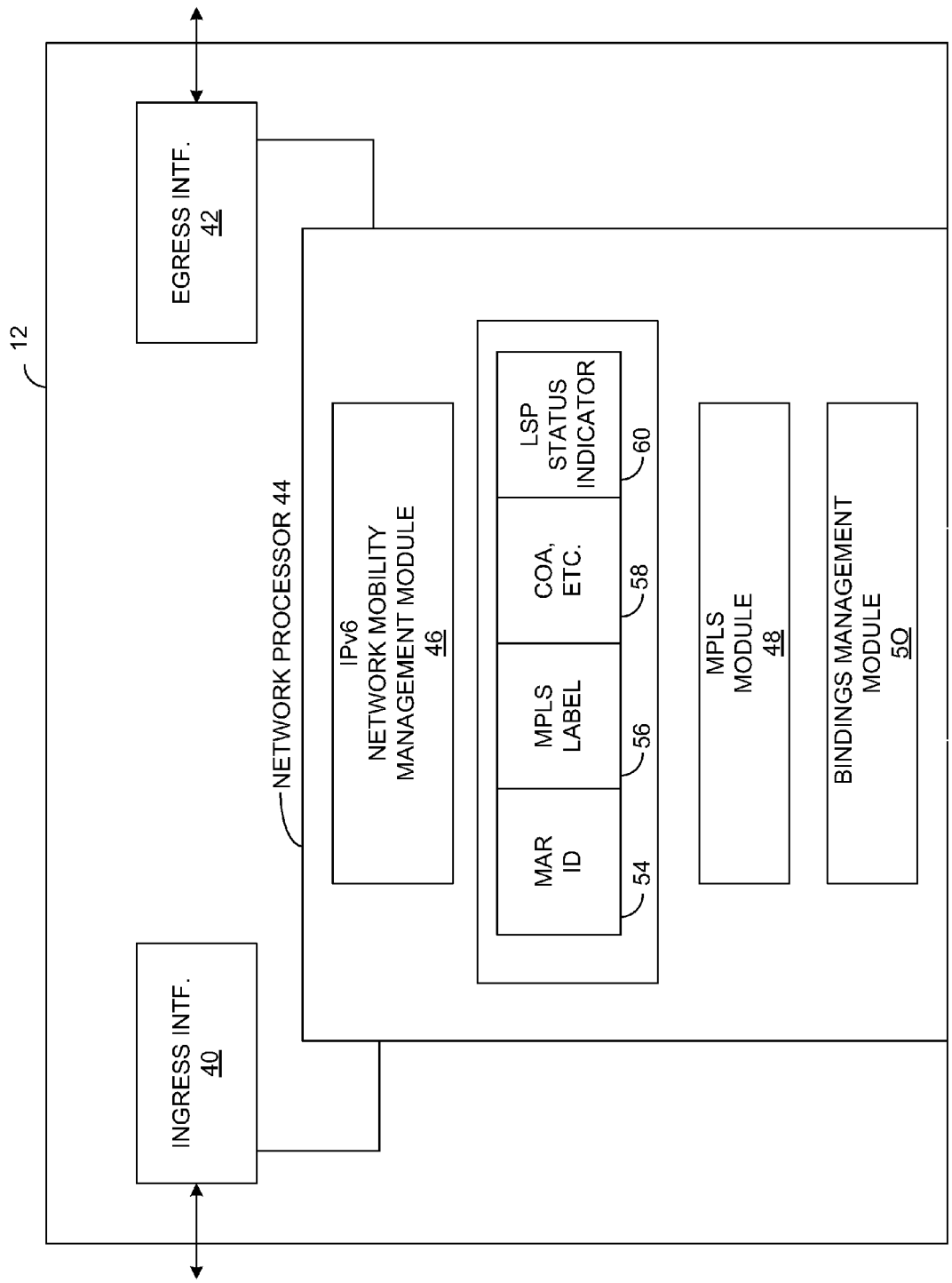
FIG. 2 is a block diagram of one embodiment of a MAP, such as may be used within the MPLS domain of FIG. 1.

The MAP 12 is configured to manage the mobility of the MAR 30 within the MPLS domain 10. FIG. 2 illustrates an example embodiment of the MAP 12. According to this non-limiting example, the MAP 12 comprises an ingress interface 40, an egress interface 42, and a network processor 44. As a non-limiting example, the network processor 44 at least functionally includes an IPv6 network mobility management module 46, an MPLS module 48, a bindings management module 50, and a bindings table or cache 52, which may be stored in memory within the MAP 12.

The bindings table or cache 52 (hereafter, simply referred to as the "bindings table 52") is configured to store a MAR ID 54, an MPLS label 56 (bound to the MAR ID), Care-of-Address (COA) information 58, and one or more LSP status indicators 60, which may be used by the MAP 12 to track or otherwise know at any given time which LSP is active for the MAR 30. Note that the bindings table 52 may be duplicated for each MAR 30 being supported by the MAP 12 or, equivalently, the bindings table 52 may be structured such that it contains such information for any number of MARs 30 being supported by the MAP 12.

The ingress interface 40 is configured for sending and receiving data within the MPLS domain 10, while the egress interface 42 is configured for transferring data between the MPLS domain 10 and an external network 8. The network processor 44 is operatively associated with the ingress and egress interfaces 40, 42 and is configured to, in response to the MAR 30 initially attaching to the MPLS domain 10 through a first one of the ARs 14-1 in the plurality of ARs 14, bind a MAR identifier 54 to an MPLS label 56 for use in routing to or from the MAR 30 within the MPLS domain 10.

Referring now to the non-limiting example of FIG. 3, the network processor 44 is configured to establish a plurality of Label Switched Paths (LSPs) 62 bound to the MPLS label 56 of the MAR 30, including establishing an active LSP 62-1 for the MAR through the first AR 14-1 and establishing an inactive LSP (e.g., LSPs 62-2, 62-3) for the MAR 30 to each remaining AR 14, which in the example of FIG. 3 include ARs 14-2 and 14-3. With this approach, each such remaining AR 14 in the plurality of ARs 14 has an established LSP 62 for the MAR 30 that can be activated later in response to the MAR 30 subsequently attaching to that remaining AR 14.

In other words, the assumption in the above example is that the MAR 30 initially attempts to attach to the MPLS domain 10 through any given one of the ARs 14, which for sake of convenient reference is denoted as "AR 14-1." In the context of this initial attachment, one may view the rest of the ARs 14 as "remaining ARs." According to one advantageous aspect of the present invention, the MPLS domain 10 uses this initial attachment to establish a plurality of LSPs 62 for the MAR 30. That is, rather than simply establishing one, active LSP 62 through the first AR 14-1 to which the MAR 30 initially attaches, the MPLS domain 10 is configured to establish an active LSP 62 through that first AR 14-1 and also to establish additional, inactive LSPs 62, with each such additional LSP 62 established at a respective one of the remaining ARs 14.

In this manner, the MPLS domain 10 can be understood as prospectively establishing multiple LSPs 62, one of them active (at the AR 14 through which the MAR 30 is initially attaching), and the rest of them established in the inactive state (with each such inactive LSP 62 being established at a respective one of the other ARs 14). Any one of the inactive LSPs 62 can be (and is) activated when/if the MAR 30 moves to the corresponding AR 14.

Thus, according to the example of FIG. 3, one might assume that the MAR 30 initially attaches to the AR labeled as AR 14-1, in which case the other two ARs, AR 14-2 and 14-3, would be considered as the remaining ARs. The MAP 12 in this example case would establish three LSPs 62, including a first LSP 62-1 with the MAR 30 through the first AR 14-1. Because the MAR 30 is attached (e.g., via wireless communication links) to the first AR 14-1, the LSP 62-1 is set up as an active LSP. The MAP 12 also initiates the establishment of two additional LSPs 62-2 and 62-3, with the LSP 62-2 being established for the MAR 30 at the AR 14-2, and with the LSP 62-3 being established for the MAR 30 at the AR 14-3. These additional LSPs 62-2 and 62-3 are established prospectively, in advance of the MAR 30 attaching to the MPLS domain 10 through either the AR 14-2 or 14-3. As such, the LSPs 62-2 and 62-3 are established as inactive LSPs. This prospective establishment is advantageous for a number of reasons, including the ability to quickly activate them later, if and when they are needed as a consequence of mobility among the ARs 14 by the MAR 30.

As an example of establishing an LSP 62 as an inactive path, the path setup request messages used to set up these additional, inactive LSPs 62 may include a flag or other indicator that signifies that they are to be established in the inactive state. In some sense, an LSP 62 that is in an inactive state may be considered to be a "virtual" LSP because the LSP would normally extend to the MAR 30 through the AR 14 to which the MAR 30 is actually attached. However, in this example, the MAR 30 is attached through the AR 14-1; thus, an LSP 62 that is established in the inactive state through any given one of the other ARs 14 does not extend to the MAR 30 and will extended to the MAR 30 only when the MAR 30 moves to that AR 14. If and when such a move occurs, the MAR 30 will, according to these teachings, already have an LSP 62 established for it at the respective AR 14, and that LSP 62 need only be activated. Advantageously, that activation can be accomplished or at least initiated at the AR-level, based on the AR 14 recognizing that an attaching MAR 30 has an identity that was previously bound to one of the inactive LSPs 62 existing at the AR 14.

In general, then, there is a plurality of LSPs 62 established for any given MAR 30, in response to that MAR 30 initially attaching to the MPLS domain 10 through any one of the domain's ARs 14. Note that a general example may be that the MPLS domain 10 establishes LSPs 62 for a given MAR 30 in response to that MAR initially attaching to any one of the ARs 14 within the MPLS domain 10. Of course, as described and claimed herein, it should be understood that the present invention does not necessarily require that LSPs 62 be established at all ARs 14 within the MPLS domain 10.

For example, in a large domain or for domains with certain geographic peculiarities, e.g., where a train transits a certain known path that traces along a defined subset of ARs 14, it may be that the initial attachment of a MAR 30 prompts the establishment of LSPs 62 at more than one but less than all of the ARs 14, including the establishment of one or more LSPs 62 as inactive paths, along with the establishment of one LSP 62 as an active path. As a further clarification, it should be understood that establishing an "LSP 62" at a given AR 14 for a given MAR 30 is used to broadly refer to the establishment of one bidirectional LSP and also to the case where two associated unidirectional LSPs are established, i.e., one downstream LSP in the direction from the MAP 12 toward the AR 14, and one upstream LSP in the direction from the AR 14 toward the MAP 12.

Thus, the notion of more than one LSP 62 being established in response to a MAR 30 attaching to the MPLS domain 10 refers not to establishing a pair of unidirectional LSPs between the MAP 12 and any one of the ARs 14, but rather to the establishment of an active LSP 62 (possibly a unidirectional pair) for the MAR 30 at the AR 14 to which it is actually attached or is attaching, and one or more inactive LSPs 62 (possibly as unidirectional pairs) for the MAR 30 at one or more other ones of the ARs 14. Because the MAR 30 is not attached to these one or more other ARs 14, it will be understood that the establishment of the inactive LSPs 62 is a prospective establishment done in recognition that the MAR 30 is a mobile router and therefore may move to any one or more of these other ARs 14. If an inactive LSP 62 comprises a pair of unidirectional LSPs, it will be understood that the downstream path setup request message(s) sent from the MAP 12 toward the involved AR 14 can carry a state flag that indicates that the path should be set up as an "inactive" path. The same or a similar mechanism can be used for the associated upstream path setup request message(s) sent from the AR 14 toward the MAP 12.

Although multiple LSPs 62 are set up for a given MAR 30, with one LSP 62 involving a respective one of the ARs 14, only one of those LSPs 62 is considered to be in the active state at any given time, with the other LSPs 62 being considered as inactive. The "active" LSP 62 changes as the MAR 30 moves among the ARs 14. In this regard, the network processor 44 is configured to send data to the MAR 30 and receive data from the MAR 30, as needed, via the active LSP 62 and change which LSP 62 is considered by the MAP 12 to be the active LSP 62 for the MAR 30, responsive to detecting movement by the MAR 30 from one AR 14 to another.

Alternatively, the MAR 30 may be of a type that can connect to more than one AR 14 at a time, e.g., in an "n-casting" sense. However, even where the MAR 30 can support more than on active path, the teachings herein apply—e.g., establish multiple LSPs 62 upon initial attachment by the MAR 30, including one or more LSPs 62 that are set up as inactive LSPs. Doing so simplifies and improves mobility management of the MAR 30 by having established but inactive LSPs 62 in place for the MAR 30 at other ARs 14, that can be efficiently activated if/when the MAR 30 moves to one of the other ARs 14.

One sees in the diagram depicted in FIG. 4 a non-limiting example format for a path setup request message 64, such as the MAP 12 may be configured to send to ARs 14, for establishing an LSP 62 for the MAR 30, and for controlling whether the LSP 62 is established as an active LSP or as an inactive LSP.

As noted, the network processor 44 in the MAP 12 is configured to establish each inactive LSP 62 by sending a path setup request message to a respective one of the remaining ARs 14. The path setup request message includes the MPLS label 56 for the MAR 30 and a path state indicator or indicators 60 indicating that the requested path is to be established as an inactive path, and further includes MAR identification information, so that each remaining AR 14 can identify the MAR 30 upon any subsequent attachment by the MAR to that AR 14, and, in response to such identification, activate the inactive LSP 62 for the MAR 30.

The non-limiting example message format shown in FIG. 4 may be used. There, a path setup request message 64 includes header and/or other data 66, which may be used to identify the message type, etc. The path setup request message 64 further includes a field for the MPLS label 56, and further fields for MAR ID information 68 and one or more path state indicators 70. Thus, in the context of the MAP 12 binding an MPLS label 56 to a MAR 30 in response to that MAR 30 initially attaching to the MPLS domain 10, it will be understood that the MAP 12 can initiate the establishment of an inactive LSP 62 for the MAR 30 at any given one of the ARs 14 by sending a path setup request message 64 that includes the assigned MPLS label 56 and MAR identification information 68, along with a path state indicator 70 indicating that the path is to be established as an inactive path.

The MAR identification information 68 may comprise all or part of the certificate received at the MAP 12 from the MAR 30 as part of the initial attachment/authentication procedures, or the MAR identification information 68 may be derived from the MAR certificate or identification values contained therein—e.g., a cryptographic hash may be derived at the MAP 12 from the MAR certificate, for the MAR 30, and that hash rather than the whole certificate may be sent in the (inactive) path setup request message 64. One advantage to using less than all of the MAR certificate for identification is reduced storage space at the ARs 14 at which inactive LSPs 62 are established. That is, each such AR 14 stores the MAR identification information 68 for later use in recognizing the MAR 30 from its certificate (in the case where the MAR 30 later moves to the AR 14 and attempts to attach through it). Because there may be any number of MARs 30 to be recognized, each having its own established inactive LSP 62 waiting on activation, reducing the storage requirements for MAR identification information 68 has advantages.

Broadly, then, it will be understood that the MAP 12 in one or more embodiments is configured to include the MAR identification information 68 in the path setup request message 64 that is used for establishing an inactive LSP 62 by including MAR credentials received at the MAP 12 for the MAR 30 as part of the MAR 30 initially attaching to the MPLS domain 10 through a first one of the ARs, or by including a hash value derived from the MAR credentials.

In that latter case, the MAP 12 is configured to send the hash value rather than all of the MAR credentials, and each of the ARs 14 in the plurality of ARs 14 knows the same hash function as used by the MAP 12 to obtain the hash value, or knows a complementary hash function. With this configuration, each AR 14 can associate the MAR 30 with the inactive LSP 62 previously established at the AR 14 for the MAR 30, based on the AR 14 receiving the MAR credentials from the MAR 30 upon the MAR 30 subsequently attaching to the AR 14.

Note that the path state indicator(s) 70 in the example message format indicate to the message recipient whether the requested LSP is to be established in the active state or in the inactive state. According to the teachings herein, an LSP 62 can be established in either state, and can be transitioned from the inactive state to the active state, and vice versa. As a general proposition, a given MAR 30 attached to the MPLS domain 10 will therefore have a plurality of established LSPs 62, with only one of them active at any given time (at the AR 14 through which the MAR 30 is currently connected) and with the remaining ones inactive. Of course, as the MAR 30 moves among the ARs 14, the active/inactive state of the affected LSPs 62 changes.

To that end, in one or more embodiments, the MAP 12 is configured to change which LSP 62 is considered by the MAP 12 to be the active LSP 62 for the MAR 30 based on updating one or more logical indicators at the MAP 12 responsive to at least one of: the MAP 12 detecting movement of the MAR 30 among the ARs 14, or the MAP 12 receiving signaling from any one or more of the ARs 14 in association with any of those ARs 14 activating or deactivating the LSP 62 previously established at the AR 14 for the MAR 30. Note that these logical indicators are, for example, the LSP status indicators 60 as shown in FIG. 2 and should not be confused with the path state indicator(s) 70, which are included in a path setup request message 64, to control whether a requested LSP is initially established in the active or inactive state.

As for the MAP 12 keeping track of which LSP 62 is active at any given time, the MAP 12 in one or more embodiments is configured to send signaling to the AR 14 from which the MAR 30 most recently moved. That signaling indicates to the AR 14 that it should treat its LSP 62 for the MAR 30 as an inactive LSP 62 and thus retain associated routing parameters so that the inactive LSP 62 can be re-activated at the AR 14 should the MAR 30 subsequently reattach to the AR 14.

Further, as part of its mobility management functionality, the MAP 12 in one or more embodiments is configured to receive end host identifiers identifying any end hosts 32 that are attached to the MAR 30, and to bind the end host identifiers to the MPLS label 56 for the MAR 30, so that traffic for the end hosts 32 is routed on the active LSP 62 for the MAR 30. Note that the end host identifiers may be received in conjunction with other information provided to the MAP 12 upon the MAR's initial attachment to the MPLS domain 10, and received subsequently as needed, whenever a new end host 32 attaches to the local network provided by the MAR 30 and whenever one of the current end hosts 32 leaves the MAR's local network.

As a further aspect of mobility management functionality, the MAP 12 in one or more embodiments is configured to create a Domain Name Server (DNS) entry at the MAP 12 that links the MAR identifier 54 to an IPv6 address associated with the egress interface 42 of the MAP 12. The MAP 12 is further configured to link the IPv6 address to any end host identifiers received at the MAP 12 for end hosts 32 attached to the MAR 30.

Figure 5:
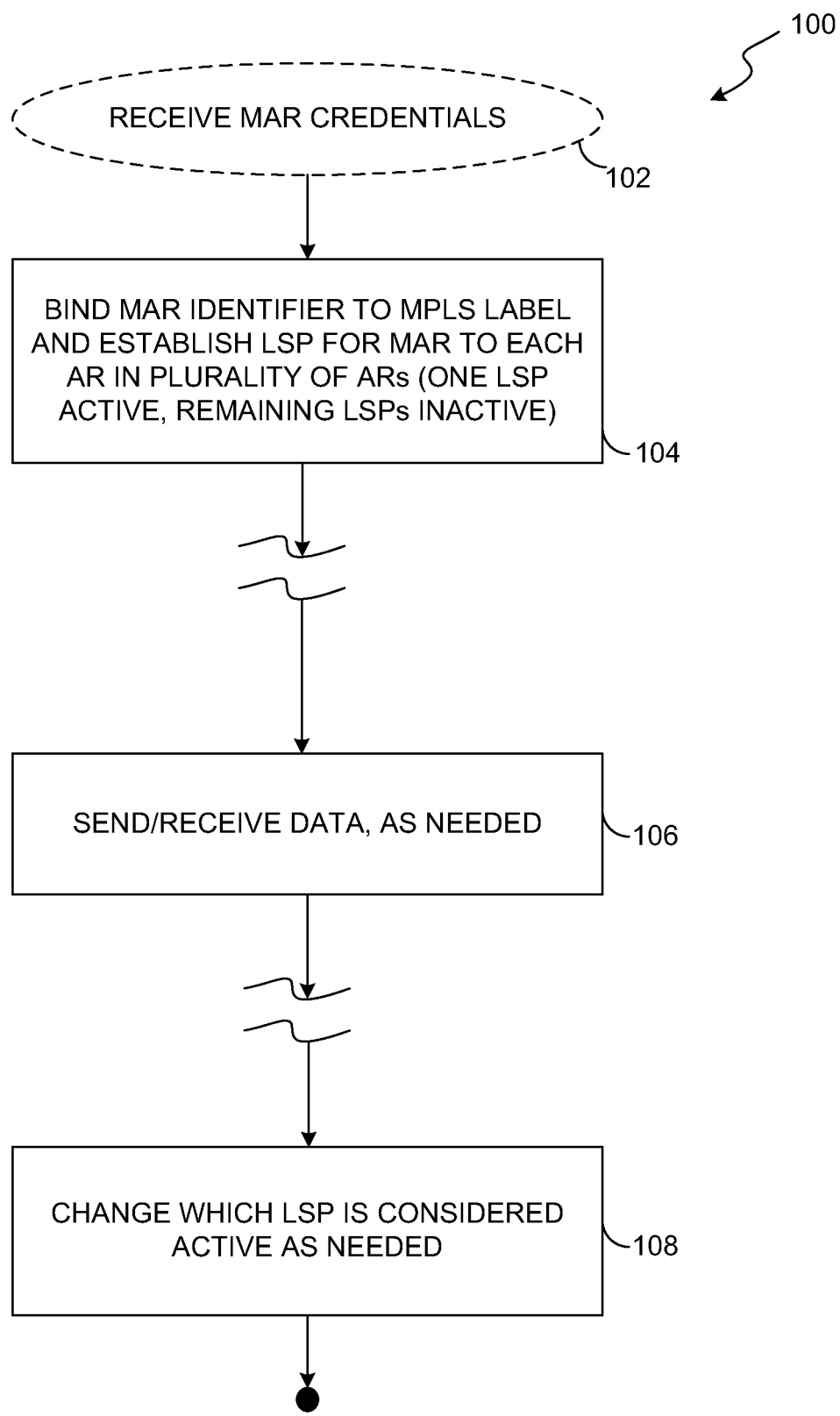
FIG. 5 is a logic flow diagram illustrating one embodiment of MAP-based processing taught herein.

FIG. 5 illustrates a MAP-based method that is consistent with the above operations. The illustrated method is implemented, for example, according to fixed or programmable digital processing circuitry, or some combination of both. To the extent that the processing method is implemented in whole or in part in digital processing circuitry, in a non-limiting example such circuitry comprises one or more microprocessors, digital signal processors, or the like, that is/are particularly configured to carry out the illustrated method based on the execution of stored computer program instructions. To that end, it will be understood that the MAP 12 may including computer resources, such as one or more CPUs, memory, etc., and may store a computer program, the execution of which configures the MAP 12 to carry out the illustrated method.

Further, while illustrated in a serial depiction, one or more of the illustrated method operations may be carried out in another sequence, or executed in parallel, possibly in conjunction with performing other processing functions. It should also be noted that the illustrated method may be performed on an ongoing basis, looped or otherwise. Finally, the illustrated method illustrates the example case for any given single MAR 30. The same method may be repeated or performed in parallel (as needed) for other MARs 30 being handled by the MAP 12.

With the above qualifications in mind, FIG. 5 illustrates a method 100 of managing the mobility of a MAR 30 within an MPLS domain 10 that includes a plurality of ARs 14 communicatively coupled to a MAP 12 of the MPLS domain 10. The method 100 is implemented in the MAP 12 and comprises, in response to the MAR 30 initially attaching to the MPLS domain 10 through a first one of the ARs 14 in the plurality of ARs 14, binding a MAR identifier 54 to an MPLS label 56 for use in routing to or from the MAR 30 within the MPLS domain 10 and establishing a plurality of LSPs 62 bound to the MPLS label 56 of the MAR 30 (Block 104). This includes establishing an active LSP 62 for the MAR 30 through the first AR 14 and establishing an inactive LSP 62 for the MAR 30 to each remaining AR 14, so that each remaining AR 14 in the plurality of ARs 14 has an established LSP 62 for the MAR 30 that can be activated later in response to the MAR 30 subsequently attaching to the remaining AR 14.

Note that the processing in Block 104 generally is initiated in response to the MAP 12 receiving MAR credentials for the MAR 30 (Block 102). As noted before, when a given MAR 30 attempts attachment through any given AR 14, it provides identification information to the AR 14, such as by providing its certificate. The processing of method 100 can therefore be understood as being undertaken in the case that the MAR certificate is verified. After or as part of such verification, the MAR certificate is passed along from the involved AR 14 to the MAP 12, and that action may be understood as the "step" indicated by Block 102.

In any case, after the LSPs 62 are established for the MAR 30, data is sent and received as needed (Block 106), where such data is routed along the active LSP 62 to/from the MAR 30, the AR 14 to which the MAR 30 currently is attached, and any number of intervening hops (e.g., intermediate LSRs 20 from FIG. 1) between the involved AR 14 and the MAP 12.

Further, the method 100 includes changing which LSP 62 is considered by the MAP to be the active LSP 62 for the MAR 30, responsive to the MAP 12 detecting movement by the MAR 30 from one AR 14 to another (Block 108). It will be appreciated that such processing is done on an as needed basis and may be repeated over any number of movements of the MAR 30 between respective ARs 14 in the MPLS domain 10.

As earlier described by way of example, establishing each inactive LSP 62 comprises the MAP 12 sending a path setup request message 64 to a respective one of the remaining ARs 14 that includes the MPLS label 56 for the MAR 30 and a path state indicator or indicators 70 indicating that the requested path is to be established as an inactive path. The message 64 further includes MAR identification information 68, so that the remaining AR 14 can identify the MAR 30 upon any subsequent attachment and, in response to such identification, activate the inactive LSP 62 for the MAR 30.

Figure 6:
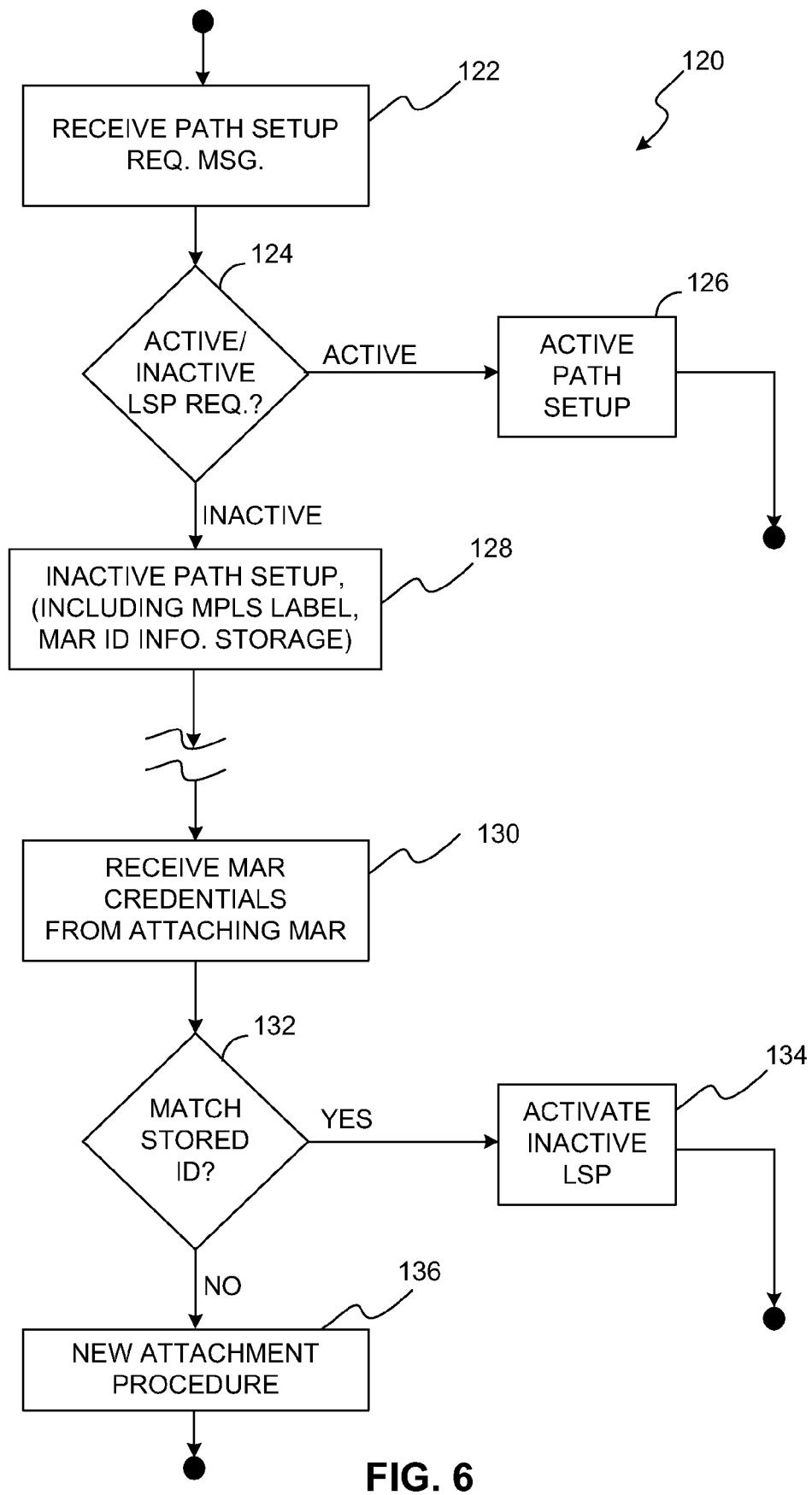
FIG. 6 is a logic flow diagram illustrating one embodiment of AR-based processing taught herein.

Complementing the MAP processing of method 100, FIG. 6 illustrates an example embodiment of a method 120 of managing the mobility of a MAR 30 within an MPLS domain 10 that includes a plurality of ARs 14 communicatively coupled to a MAP 12 of the MPLS domain 10. The method 120 is implemented in any one of the ARs 14, e.g., it may be implemented in each one of them. Further, as with FIG. 5, it should be understood that one or more steps of the method 120 may be performed in an order different than that illustrated, and that the method 120 may be carried out for one or any number of MARs 30.

Finally, it should be understood that each AR 14 includes fixed or programmable circuitry, or both, such as microprocessor-based circuitry, that is configured to carry out the method 120. In at least one example of such, the example AR 14 includes a digital processing circuit, such as a CPU, that is associated with program memory or other storage, where such memory or storage contains a computer program, the execution of which by the digital processing circuit particularly configures it to carry out the method 120.

With these qualifications in mind, the method 120 comprises receiving a path setup request message 64 from the MAP 12 for establishing an LSP 62 for the MAR 30 before the MAR 30 has attached to the AR 14 (Block 122). The path setup request message 64 includes an MPLS label 56 for the MAR 30, MAR identification information 68, and a path state indicator or indicators 70—for convenience, one may simply refer to a path state indicator 70 with the understanding that multiple indicators can be included.

The method 120 continues with the AR 14 determining from the path state indicator 70 that the LSP 62 is to be established in an inactive state, pending a subsequent attachment by the MAR 30 to the AR 14 ("INACTIVE" from Block 124). Of course, the AR 14 accommodates the case where the path setup request message 64 indicates that the requested path is to be set up as an active LSP 62. (One sees this processing direction in the "ACTIVE" path from Block 124, which results in the AR 14 undertaking processing to establish an active LSP 62 (Block 126).

If the LSP 62 is to be established as an inactive path, processing continues from Block 124 to Block 128, where the AR 14 performs inactive path setup processing, and stores the MPLS label 56, MAR identification information 68 or, equivalently, information derived therefrom such as by cryptographic hashing.

Thus, the AR 14 establishes the LSP 62 at the AR 14 as an inactive LSP 62 waiting for subsequent attachment to the AR 14 by the MAR 30. As part of that processing, the AR 14 stores the MPLS label 56 for the MAR 30 in association with the inactive LSP 62, and further stores the MAR identification information 68 or information derived therefrom. The "association" here should be understood as the AR 14 maintaining a logical association between the MAR's identity and the inactive LSP 62 that is (or is being established) at the AR 14 for possible later use with the MAR 30. Such an association can be effected by storing the MPLS label 56 along with the MAR identification information 68 (or derived data) in the same row of a path table or other such data structure maintained at the AR 14 for tracking LSPs 62.

In any case, according to the illustrated example processing flow, it is assumed that the MAR 30 at some indeterminate time later moves to the AR 14. Thus, the method 120 includes the AR 14 subsequently receiving MAR credentials from the MAR 30 in conjunction with the MAR 30 attaching to the AR 14 (Block 130), identifying from the MAR credentials that the MAR 30 is associated with the inactive LSP 62 (YES from Block 132), and activating the inactive LSP 62 (Block 134), based at least in part on signaling the MAR 30, to extend the LSP 62 to the MAR 30. If the MAR 30 is not recognized, i.e. a MAR 30 for which there is no inactive LDP 62 already established, (NO from Block 132) processing continues to new attachment procedures (Block 136). As will be described, this extension is based in one or more embodiments on the MAR 30 implementing suitable MPLS protocols for establishing and managing LSPs 62 that extend to or terminate at the MAR 30.

Figure 7:
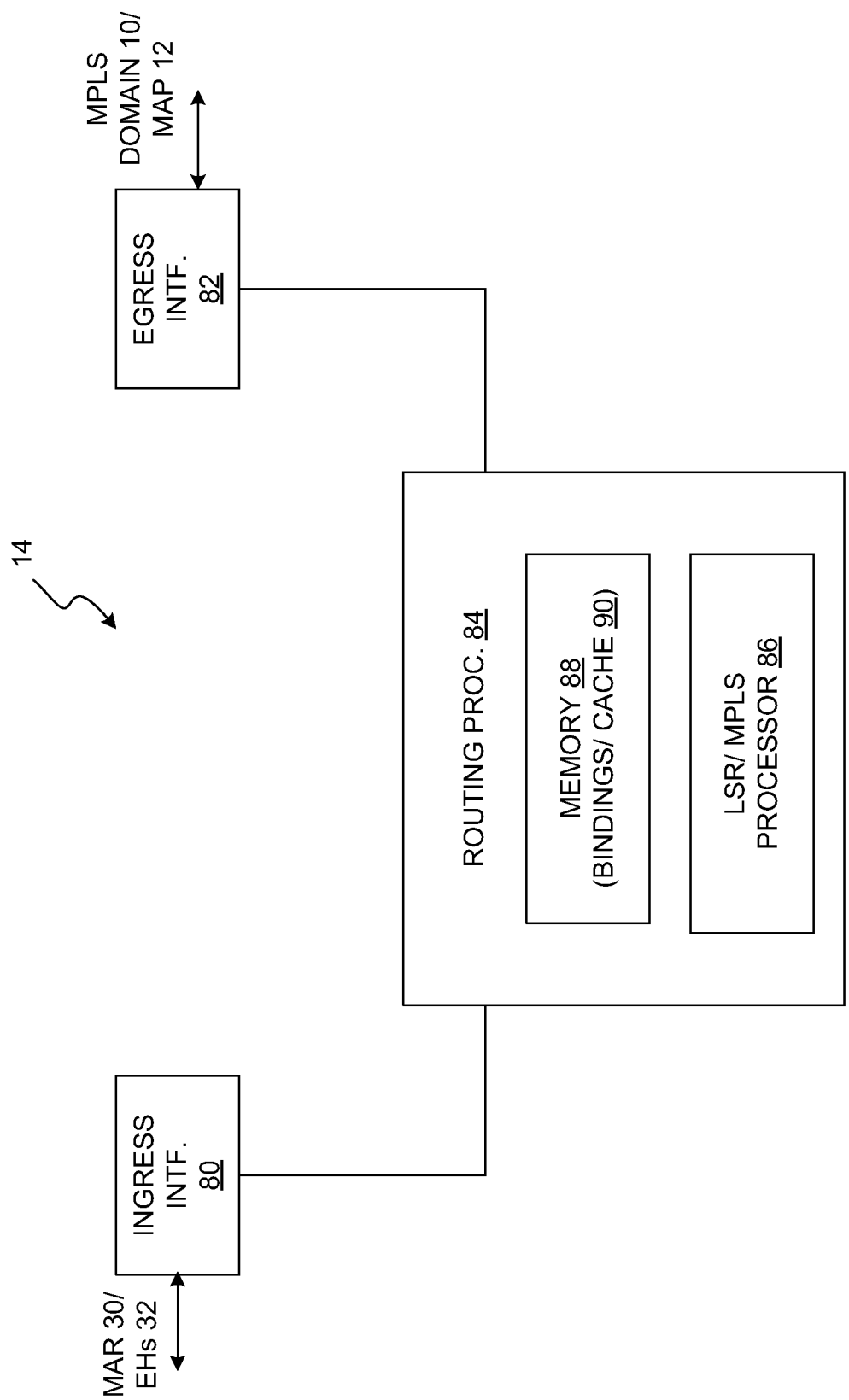
FIG. 7 is a block diagram of one embodiment of an AR, such as may be used in the MPLS domain of FIG. 1.

FIG. 7 illustrates a non-limiting example embodiment of any given one of the ARs 14, which is configured to carry out the above method 120, or a variation thereof. The AR 14 is configured for facilitating mobility management of a MAR 30 within an MPLS domain 10 that includes a plurality of such ARs 14 communicatively coupled to a MAP 12 of the MPLS domain 10.

The illustrated AR 14 comprises an ingress interface 80 configured for sending and receiving data to the MAR 30, an egress interface 82 configured for transferring data between the ingress interface 80 and the MPLS domain 10. The AR 14 further includes a routing processor 84 configured to: receive a path setup request message 64 from the MAP 12 for establishing an LSP 62 for the MAR 30 before the MAR 30 has attached to the AR 14. The path setup request message 64 includes an MPLS label 56 for the MAR 30, MAR identification information 68, and a path state indicator 70.

The routing processor 84 is configured to determine from the path state indicator 70 that the LSP 62 is to be established in an inactive state, pending a subsequent attachment by the MAR 30 to the AR 14. Still further, the routing processor 84 is configured to establish the LSP 62 at the AR 14 as an inactive LSP 62 waiting for subsequent attachment to the AR 14 by the MAR 30, based in part on storing the MPLS label 56 for the MAR 30 in association with the inactive LSP 62, and further storing the MAR identification information 68 or information derived therefrom.

The routing processor 84 at least functionally includes an LSR/MPLS processor 86 that is compatible with label switched routing, path set up, etc., within the context of the MPLS domain 10. The routing processor 84 may further include or be associated with memory 88, which is used in one or more embodiments for storing bindings information and, possibly, caching data 90 and configuration information. Such storage may therefore include the MPLS label 56, the MAR identification information 68 or derived ID information, etc.

Again, assuming that the MAR 30 moves to the AR 14 some time after establishment of the inactive LSP 62 at the AR 14 for the MAR 30, it will be understood that the AR 14 subsequently receives MAR credentials from the MAR 30 in conjunction with the MAR 30 attaching to the AR 14. In this context, the routing processor 84 is configured to identify from the MAR credentials that the MAR 30 is associated with one of the inactive LSPs 62 already established at the AR 14.

Based on that identification, the routing processor 84 is configured to activate the inactive LSP 62, based at least in part on signaling the MAR 30, to extend the LSP 62 to the MAR 30.

In at least one embodiment, as part of activating the inactive LSP 62, the AR 14 is configured to signal the MAP 12, to apprise the MAP 12 of such activation. In the same or another embodiment, the AR 14 is configured to send the MPLS label 56 for the LSP 62 to the MAR 30 as part of activating the LSP 62.

Further, in at least one contemplated embodiment, the MAR credentials comprise a certificate, the AR 14 is configured to identify from the MAR credentials that the MAR 30 is associated with the inactive LSP 62 based on determining a MAR identification from the certificate and recognizing that the MAR identification matches or otherwise corresponds to the MAR identification information 68 received in the earlier path setup request message 64 from the MAP 12. Equivalently, the AR 14 can make the identification matching based on derived information.

In the same or another embodiment, the AR 14 is configured to perform Domain Name Server (DNS) optimization for end hosts 32 connected through the MAR 30. In this context, the AR 14 is configured to determine whether a DNS query from any one of those end hosts 32 is directed to any other of those end hosts 32, and respond to that DNS query directly, without passing the DNS query up to the MAP 12 or another designated DNS node, for processing. Doing so saves request signaling and/or traffic overhead that can be handled locally by the AR 14.

Figure 8:
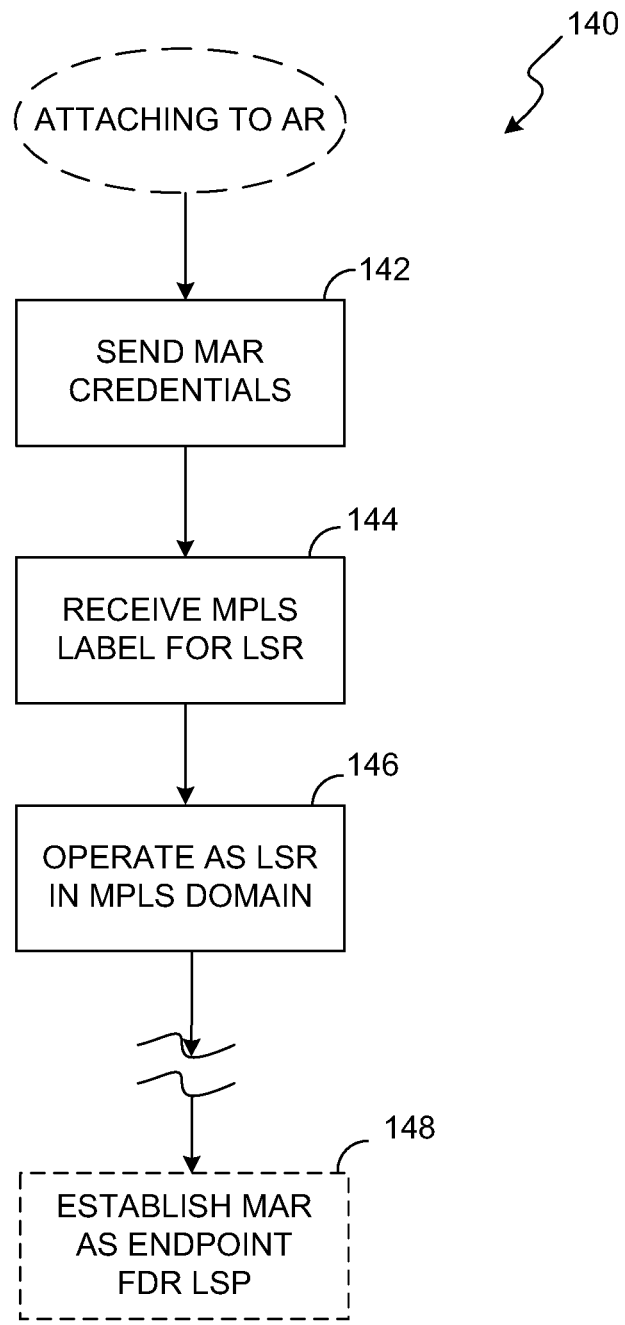
FIG. 8 is a logic flow diagram illustrating one embodiment of MAR-based processing taught herein.

Turning to the MAR 30, the teachings herein disclose corresponding, complementary methods and apparatuses for implementation at the MAR 30. FIG. 8 discloses an example method 140 that is implemented at the MAR 30.

First, it should be understood that one or more steps of the method 140 may be performed in an order different than that illustrated, and that the method 140 may be carried out in essentially any type of MAR 30. For example, the MAR 30 includes fixed or programmable circuitry, or both, such as microprocessor-based circuitry, that is configured to carry out the method 140. In at least one example of such, the example MAR 30 includes a digital processing circuit, such as a CPU, that is associated with program memory or other storage, where such memory or storage contains a computer program, the execution of which by the digital processing circuit particularly configures it to carry out the method 140.

With these qualifications in mind, the method 140 provides for managing the mobility of the MAR 30 within an MPLS domain 10 that includes a plurality of ARs 14 communicatively coupled to a MAP 12 of the MPLS domain. As illustrated, the method 140 as implemented at the MAR 30 includes the MAR 30 sending MAR credentials or MAR identification information derived therefrom to one of the ARs 14, in conjunction with attaching to the AR 14 (Block 142).

The method 140 further includes receiving an MPLS label 56 from the AR 14, for an LSP 62 to be used for label switched routing (LSR) between the MAR 30 and the MAP 12, as conducted through the AR 14 (Block 144). Processing continues with the MAR 30 carrying out processing to establish the MAR 30 as the endpoint for the LSP 62 (Block 146). Extending the LSP 62 to the MAR 30 in this manner allows the MAR 30 to operate as an LSR within the MPLS domain 10 (Block 148).

Figure 9:
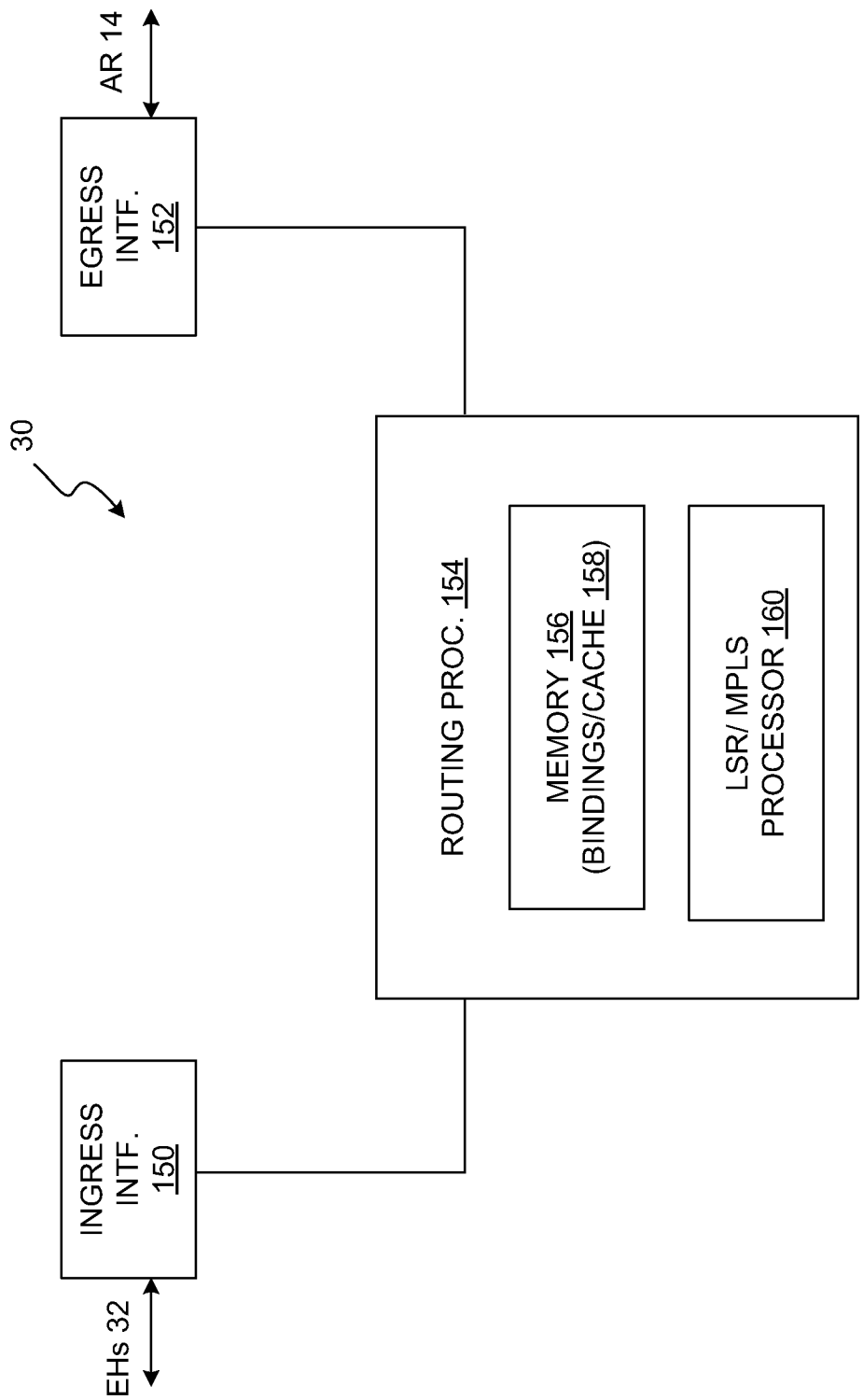
FIG. 9 is a block diagram of one embodiment of a MAR, such as may be used with the MPLS domain of FIG. 1.

FIG. 9 illustrates an example implementation of the MAR 30, which is configured to carry out the above method 140, or variations thereof. The illustrated MAR 30 is configured for operation in an MPLS domain 10 that includes a plurality of ARs 14 communicatively coupled to a MAP 12 of the MPLS domain 10. The MAR 30 comprises: an ingress interface 150 configured for sending and receiving data to and from end hosts 32 attached to the MAR 30, and an egress interface 152 configured for transferring such data between the MAR 30 and the MPLS domain 10.

Further, the MAR 30 includes a routing processor 154 that is configured to: send MAR credentials or MAR identification information derived therefrom to one of the ARs 14, in conjunction with attaching to the AR 14; receive an MPLS label 56 from the AR 14, for an LSP 62 to be used for LSR between the MAR 30 and the MAP 12, as conducted through the AR 14; and establish the MAR 30 as the endpoint for the LSP 62.

In supporting the above processing, the routing processor 154 in one or more embodiments at least functionally includes memory 156 or other storage, for storing bindings/cached information 158, and further includes an LSR/MPLS processor 160. The memory 156 stores, for example, the MPLS label 56 and other path information related to the LSP 62. Similarly, the LSR/MPLS processor 160 is configured according to the label-related signaling and transmission/reception protocols used in the MPLS domain 10, so that the MAR 30 operates as an LSR within that domain. Such a configuration includes, for example, the ability to process path setup request messages 64, send/receive signaling in accordance with a label distribution protocol, etc.

Figure 10:
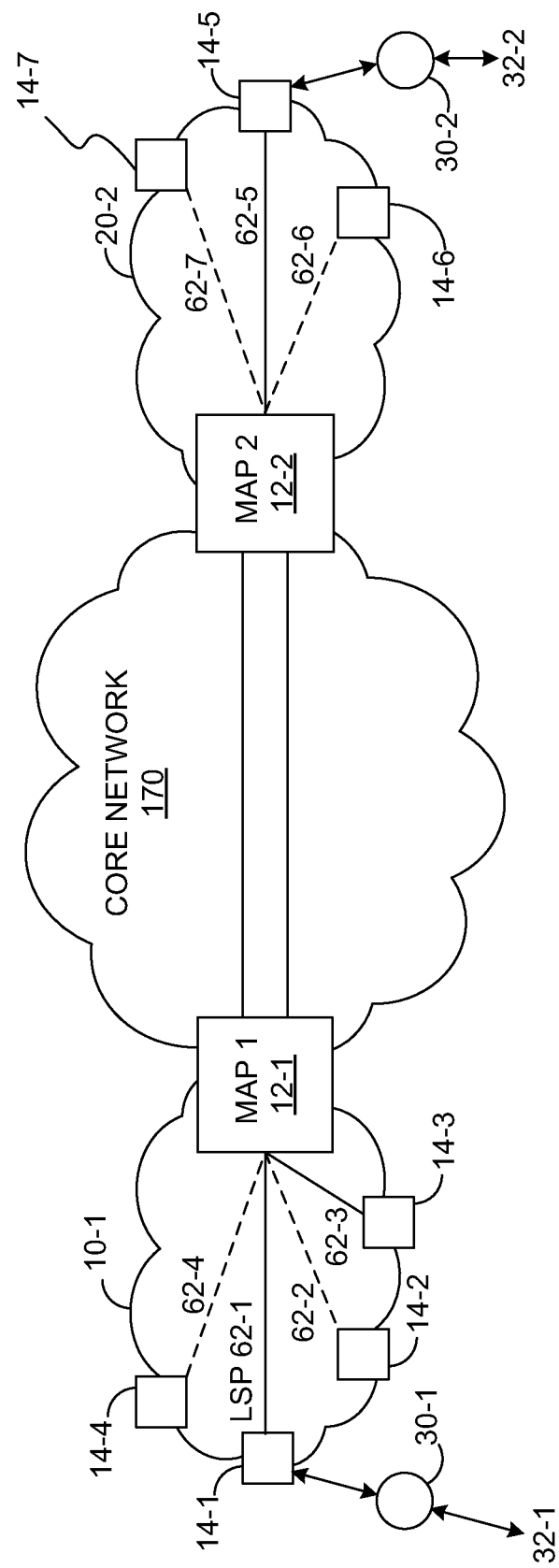
FIG. 10 is a block diagram of one embodiment of label-based communications for end hosts within different MPLS domains.

Among the many advantages associated with the above examples for the MPLS domain 10, MAP 12, ARs 14, and MAR 30, the teachings herein provide for efficient mobility management in the context of traffic going between an end host 32 attached to one MAR 30 in one MPLS domain 10 and an end host 32 attached to another MAR 30 in another MPLS domain 10. FIG. 10 illustrates an example case.

In FIG. 10, one sees an end host 32-1 connected to a MAR 30-1, which in turn is connected to an AR 14-1, which is one among a number of ARs 14-1, -2, -3, -4, included in a first MPLS domain 10-1. There is an active LSP 62-1 (solid line) from the MAR 30 to a MAP 12-1 in the MPLS domain 10-1. The active LSP 62 passes through the AR 14-1 to which the MAR 30-1 is currently connected. There are inactive LSPs 62 (dashed line) "waiting" on the MAR 30-1, with each such LSP 62-2, -3, and -4, established at respective ones of the ARs 14-2, -3, and -4.

The MAP 12-1 is communicatively coupled to another MAP 12-2 in another MPLS domain 10-2 through, e.g., a core network, which may be understood as Internet infrastructure associated with any number of network operators. The MAP 12-2 has an active LSP 62-5 established with the MAR 30-2 through one of its ARs 14, i.e., through AR 14-5. There are inactive LSPs 62-6 and 62-7 "waiting" for the MAR 30-2 at the remaining ARs 14-6 and 14-7, respectively. Stretching the dedicated LSPs 62 to the MARs 30-1 and 30-2 allows sending the destination MAR's assigned MPLS label 56, in addition to its location, to a querying node, thus enabling an e2e MPLS-based communication between MAR source (e.g., 30-1) and MAR destination (e.g., 30-2). This approach may include IP tunneling between the two MAPs 30-1 and 30-2, through the core network 170.

More broadly, within the context of one MPLS domain 10, the MAP 12 establishes dedicated LSPs 62 for the MAR 30 with a plurality of ARs 14 in the MPLS domain 10, e.g., with all of them. For the ARs 14 at which the MAR 30 is not currently attached, these LSPs 62 can be imagined as being "virtually" attached to the MAR 30. That is, they are dedicated to the MAR 30 and the AR 14 has identification information necessary to later recognize the MAR 30 when it attaches to the AR 14 and correspondingly activate the LSP 62 and extend it to the MAR 30.

Establishing these "virtual LSPs (VLSPs) requires sending specific parameters to each AR 14 in order to enable later activation of the inactive LSP 62 at any given one of the ARs 14, where such activation should occur upon authenticating the MAR 30. These parameters include, for example the MAP-assigned LSP label (the MPLS label 56) as well as the hash of its public key, which can be understood as identification information derived from the MAR's certificate.

Upon attachment to the MPLS domain 10, the MAR 30 sends its certificate to its new AR 14 which in turn, validates it and forwards it to the MAP 12. The MAR's egress interface 152 gets assigned a "local" location from the AR 14 (which may be transparent to the MAR 30). Such location is not published to nodes located outside the MPLS domain 10; however, it may be used by nodes located within the MPLS domain 10 in order to reach the MAR 30 (e.g., by the MAP 12, LSRs 20, and/or ARs 14).

Upon receiving the MAR's certificate, the MAP 12 assigns its own egress interface's location to the MAR 30 for use in external communications. The MAP 12 further establishes a dedicated, active LSP 62 between it and the MAR 30 through the AR 14 to which the MAR 30 is actually attached, and it and binds the MAR's certificate to a corresponding MPLS label 56. After or concurrent with establishing the active LSP 62, the MAP 12 establishes dedicated, inactive LSPs 62 with at least some and preferably all other ARs 14 in the MPLS domain 10. These LSPs require a special treatment as detailed herein, as they are supposed to reach the MAR itself but the MAR 30 is not physically attached to such ARs 14.

Upon activating a particular LSP 62 in response to the MAR 30 attaching, the corresponding AR 14 should notify the MAP 12, such as by sending an LSP_Activate (LSPA) message that carries the MAR's previously assigned MPLS label 56. In at least one embodiment, it is then up to the MAP 12 to probe the AR 14 as to whether the MAR 30 is still attached to its link or not (e.g., using a predetermined lifetime). In such embodiments, it follows that when the MAP 12 detects that a particular MAR 30 has left its MPLS domain 10, it can reuse the MPLS label 56 that was associated with the corresponding MAR 30 to establish new LSPs 62, e.g., for another MAR 30.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of managing the mobility of a Mobile Access Router (MAR) within a Multi-Protocol Label Switching (MPLS) domain that includes a plurality of Access Routers (ARs) communicatively coupled to a Mobility Anchor Point (MAP) of the MPLS domain, said method implemented in the MAP and comprising:

in response to said MAR initially attaching to the MPLS domain through a first one of the ARs in the plurality of ARs, binding a MAR identifier to an MPLS label for use in routing to or from the MAR within the MPLS domain and establishing a plurality of Label Switched Paths (LSPs) bound to the MPLS label of the MAR, including establishing an active LSP for the MAR through the first AR and establishing an inactive LSP for the MAR to each remaining AR, so that each remaining AR in the plurality of ARs has an established LSP for the MAR that can be activated later in response to the MAR subsequently attaching to the remaining AR;

sending data to the MAR and receiving data from the MAR, as needed, via the active LSP; and changing which LSP is considered by the MAP to be the active LSP for the MAR, responsive to detecting movement by the MAR from one AR to another;

wherein establishing each inactive LSP comprises the MAP sending a path setup request message to a respective one of the remaining ARs that includes the MPLS label for the MAR and a path state indicator indicating that the requested path is to be established as an inactive path, and further includes MAR identification information, so that the remaining AR can identify the MAR upon any subsequent attachment and, in response to such identification, activate the inactive LSP for the MAR; and wherein the MAP includes the MAR identification information in the path setup request message used for establishing an inactive LSP by including MAR credentials received at the MAP for the MAR as part of the MAR initially attaching to the MPLS domain through the first AR, or by including a hash value derived from the MAR credentials.

2. The method of claim 1, wherein the MAP sends the hash value rather than all of the MAR credentials, and wherein each of the ARs in the plurality of ARs knows the same hash function as used by the MAP to obtain the hash value, or knows a complementary hash function, so that each AR can associate the MAR with the inactive LSP previously established at the AR for the MAR, based on the AR receiving the MAR credentials from the MAR upon the MAR subsequently attaching to the AR.

3. The method of claim 1, wherein said step of changing which LSP is considered by the MAP to be the active LSP for the MAR comprises updating one or more logical indicators at the MAP responsive to at least one of: said MAP detecting movement of the MAR among the ARs, or said MAP receiving signaling from any one or more of the ARs in association with said any one of the ARs activating or deactivating the LSP previously established for the MAR at the respective AR.

4. The method of claim 1, further comprising the MAP sending signaling to the AR from which the MAR most recently moved, indicating to that AR that it should treat the LSP for the MAR as an inactive LSP and thus retain associated routing parameters so that the inactive LSP can be reactivated should the MAR subsequently reattach to that AR.

5. The method of claim 1, wherein the MAP receives end host identifiers identifying any end hosts that are attached to the MAR, and further comprising binding the end host identifiers to the MPLS label for the MAR, so that traffic for the end hosts is routed on the active LSP for the MAR.

6. The method of claim 1, further comprising creating a Domain Name Server (DNS) entry at the MAP, linking the MAR identifier to an IPv6 address associated with an MPLS domain egress interface of the MAP, and further linking that IPv6 address to any end host identifiers received at the MAP for end hosts attached to the MAR.

7. A Mobility Anchor Point (MAP) for managing the mobility of a Mobile Access Router (MAR) within a Multi-protocol Label Switching (MPLS) domain that includes a plurality of Access Routers (ARs) communicatively coupled to the MAP, said MAP comprising:

an ingress interface for sending and receiving data within the MPLS domain;

an egress interface for transferring data between the MPLS domain and an external network; and a network processor operatively associated with the ingress and egress interfaces and configured to:

in response to said MAR initially attaching to the MPLS domain through a first one of the ARs in the plurality of ARs, bind a MAR identifier to an MPLS label for use in routing to or from the MAR within the MPLS domain and establish a plurality of Label Switched Paths (LSPs) bound to the MPLS label of the MAR, including establishing an active LSP for the MAR through the first AR and establishing an inactive LSP for the MAR to each remaining AR, so that each remaining AR in the plurality of ARs has an established LSP for the MAR that can be activated later in response to the MAR subsequently attaching to the remaining AR;

send data to the MAR and receive data from the MAR, as needed, via the active LSP; and change which LSP is considered by the MAP to be the active LSP for the MAR, responsive to detecting movement by the MAR from one AR to another;

wherein the network processor in the MAP is configured to establish each inactive LSP by sending a path setup request message to a respective one of the remaining ARs that includes the MPLS label for the MAR and a path state indicator indicating that the requested path is to be established as an inactive path, and further includes MAR identification information, so that the remaining AR can identify the MAR upon any subsequent attachment and, in response to such identification, activate the inactive LSP for the MAR; and wherein the MAP is configured to include the MAR identification information in the path setup request message used for establishing an inactive LSP by including MAR credentials received at the MAP for the MAR as part of the MAR initially attaching to the MPLS domain through the first AR, or by including a hash value derived from the MAR credentials.

8. The MAP of claim 7, wherein the MAP is configured to send the hash value rather than all of the MAR credentials, and wherein each of the ARs in the plurality of ARs knows the same hash function as used by the MAP to obtain the hash value, or knows a complementary hash function, so that each AR can associate the MAR with the inactive LSP previously established at the AR for the MAR, based on the AR receiving the MAR credentials from the MAR upon the MAR subsequently attaching to the AR.

9. The MAP of claim 7, wherein the MAP is configured to change which LSP is considered by the MAP to be the active LSP for the MAR based on updating one or more logical indicators at the MAP responsive to at least one of: the MAP detecting movement of the MAR among the ARs, or the MAP receiving signaling from any one or more of the ARs in association with said any one of the ARs activating or deactivating the LSP previously established for the MAR at the respective AR.

10. The MAP of claim 7, wherein the MAP is further configured to send signaling to the AR from which the MAR most recently moved, indicating to that AR that it should treat its LSP for the MAR as an inactive LSP and thus retain associated routing parameters so that the inactive LSP can be re-activated at the AR should the MAR subsequently reattach to the AR.

11. The MAP of claim 7, wherein the MAP is further configured to receive end host identifiers identifying any end hosts that are attached to the MAR, and to bind the end host identifiers to the MPLS label for the MAR, so that traffic for the end hosts is routed on the active LSP for the MAR.

12. The MAP of claim 7, wherein the MAP is further configured to create a Domain Name Server (DNS) entry at the MAP that links the MAR identifier to an IPv6 address associated with the egress interface of the MAP, and is further configured to link the IPv6 address to any end host identifiers received at the MAP for end hosts attached to the MAR.

13. A method of managing the mobility of a Mobile Access Router (MAR) within a Multi-Protocol Label Switching (MPLS) domain that includes a plurality of Access Routers (ARs) communicatively coupled to a Mobility Anchor Point (MAP) of the MPLS domain, said method implemented in any one of the ARs and comprising:

receiving a path setup request message from the MAP for establishing a Label Switched Path (LSP) for the MAR before the MAR has attached to the AR, said path setup request message including an MPLS label for the MAR, MAR identification information, and a path state indicator;

determining from the path state indicator that the LSP is to be established in an inactive state, pending a subsequent attachment by the MAR to the AR;

establishing the LSP at the AR as an inactive LSP waiting for subsequent attachment to the AR by the MAR, based in part on storing the MPLS label for the MAR in association with the inactive LSP, and further storing the MAR identification information or information derived therefrom; and subsequently receiving MAR credentials from the MAR in conjunction with the MAR attaching to the AR, identifying from the MAR credentials that the MAR is associated with the inactive LSP, and activating the inactive LSP, based at least in part on signaling the MAR, to extend the LSP to the MAR;

wherein said AR performs Domain Name Server (DNS) optimization for end hosts connected through the MAR, based on determining whether a DNS query from any one of those end hosts is directed to any other of those end hosts, and responding to that DNS query directly, without passing the DNS query up to the MAP or another designated DNS node, for processing.

14. The method of claim 13, wherein said step of activating the inactive LSP further includes signaling the MAP, to apprise the MAP of such activation.

15. The method of claim 13, wherein, as part of said step of activating the inactive LSP, said step of signaling the MAR includes sending to the MAR the MPLS label for the MAR.

16. The method of claim 13, wherein said MAR credentials comprise a certificate, and wherein said step of identifying from the MAR credentials that the MAR is associated with the inactive LSP comprises determining a MAR identification from the certificate and recognizing that the MAR identification matches or otherwise corresponds to the MAR identification information received in the path setup request message from the MAP.

17. An Access Router (AR) (configured for facilitating mobility management of a Mobile Access Router (MAR) within a Multi-Protocol Label Switching (MPLS) domain that includes a plurality of such ARs communicatively coupled to a Mobility Anchor Point (MAP) of the MPLS domain, said AR comprising:

an ingress interface for sending and receiving data to the MAR;

an egress interface for transferring said data between the ingress interface and the MPLS domain; and a routing processor configured to:

receive a path setup request message from the MAP for establishing a Label Switched Path (LSP) for the MAR before the MAR has attached to the AR, said path setup request message including an MPLS label for the MAR, MAR identification information, and a path state indicator;

determine from the path state indicator that the LSP is to be established in an inactive state, pending a subsequent attachment by the MAR to the AR;

establish the LSP at the AR as an inactive LSP waiting for subsequent attachment to the AR by the MAR, based in part on storing the MPLS label for the MAR in association with the inactive LSP, and further storing the MAR identification information or information derived therefrom; and subsequently receive MAR credentials from the MAR in conjunction with the MAR attaching to the AR, identify from the MAR credentials that the MAR is associated with the inactive LSP, and activate the inactive LSP, based at least in part on signaling the MAR, to extend the LSP to the MAR;

wherein said AR is configured to perform Domain Name Server (DNS) optimization for end hosts connected through the MAR, based on determining whether a DNS query from any one of those end hosts is directed to any other of those end hosts, and responding to that DNS query directly, without passing the DNS query up to the MAP or another designated DNS node, for processing.

18. The AR of claim 17, wherein the AR is, as part of activating the inactive LSP, configured to signal the MAP, to apprise the MAP of such activation.

19. The AR of claim 17, wherein the AR is configured to send the MPLS label for the LSP to the MAR as part of activating the LSP.

20. The AR of claim 17, wherein said MAR credentials comprise a certificate, and wherein said AR is configured to identify from the MAR credentials that the MAR is associated with the inactive LSP based on determining a MAR identification from the certificate and recognizing that the MAR identification matches or otherwise corresponds to the MAR identification information received in the path setup request message from the MAP.

* * * * *